(12) United States Patent
Espinosa (10) Patent No.: US 9,062,452 B2
(45) Date of Patent: Jun. 23, 2015

(54) HOLDER FOR CONCRETE ANCHORS (71) Applicant: Thomas M. Espinosa, Snohomish, WA (US)

(72) Inventor: Thomas M. Espinosa, Snohomish, WA (US)

(*) Notice: Subject to any disclaimer, the term of this patent is extended or adjusted under 35 U.S.C. 154(b) by 0 days.

(21) Appl. No.: 13/949,144

(22) Filed: Jul. 23, 2013

(65) Prior Publication Data

US 2014/0026515 A1 Jan. 30, 2014

Related U.S. Application Data (60) Provisional application No. 61/675,173, filed on Jul. 24, 2012.

(51) Int. Cl.
E04B 1/38 (2006.01)
E04C 5/00 (2006.01)
E04B 1/41 (2006.01)
E04G 21/18 (2006.01)
F16B 9/00 (2006.01)

(52) U.S. Cl.
CPC ............ *E04B 1/4171* (2013.01); *E04B 1/4121* (2013.01); *E04G 21/185* (2013.01); *F16B 9/00* (2013.01)

(58) Field of Classification Search
CPC ... E04B 1/4171; E04B 1/4121; E04G 21/185; F16B 9/00
USPC ........................ 52/700, 698, 699, 703, 506.05
See application file for complete search history.

(56) References Cited

U.S. PATENT DOCUMENTS

| | | | |
|---|---|---|---|
| 991,517 A | 5/1911 | Kennedy | |
| 1,018,490 A | 2/1912 | Hall | |
| 1,045,562 A | 11/1912 | Kennedy | |
| 1,185,765 A | 6/1916 | Brooks | |
| 1,264,189 A | 4/1918 | Keator | |
| 1,447,515 A | 3/1923 | Miller | |
| 1,940,545 A | 12/1933 | Holmes | |
| 2,689,987 A | 9/1954 | Berger | |
| 3,157,966 A | 11/1964 | Sherburne | |
| 3,224,591 A | 12/1965 | Sawyer | |
| 3,391,514 A | 7/1968 | Hall, Jr. | |
| 3,405,497 A * | 10/1968 | McNair | 52/699 |
| 3,443,351 A | 5/1969 | Michio | |
| 3,509,670 A | 5/1970 | Boll et al. | |
| 3,514,917 A | 6/1970 | Merrill, Sr. | |
| 3,517,470 A | 6/1970 | Luebkeman | |
| 3,540,762 A | 11/1970 | Dunlap | |

(Continued)

FOREIGN PATENT DOCUMENTS

| | | |
|---|---|---|
| CH | 684648 | 11/1994 |
| GB | 901681 | 7/1962 |

(Continued)

OTHER PUBLICATIONS

Chainring Construction Products LLC, www.ptanchor.com, Copyright 2009 Home, PT Anchor, Concept and Cut Sheet pages.

*Primary Examiner* — Mark Wendell
(74) *Attorney, Agent, or Firm* — Shlesinger, Arkwright & Garvey LLP (57) ABSTRACT

A holder for a concrete anchor comprises a body including a base portion for attachment to a concrete forming surface. The body includes a projection portion extending vertically from the base portion. A coupling is attached to the projection portion at one end of the coupling. The opposite end of the coupling is for threading into an anchor body.

27 Claims, 9 Drawing Sheets

(56) References Cited

U.S. PATENT DOCUMENTS

| | | | |
|---|---|---|---|
| 3,579,938 A | 5/1971 | Hanson | |
| 3,782,061 A | 1/1974 | Minutoli et al. | |
| 3,867,804 A | 2/1975 | Wilson | |
| 3,884,004 A | 5/1975 | Douma et al. | |
| 3,889,916 A | 6/1975 | Ilukowicz | |
| 3,927,497 A | 12/1975 | Yoshinaga et al. | |
| 3,935,685 A | 2/1976 | Howlett | |
| 4,169,569 A | 10/1979 | Riegler et al. | |
| 4,195,709 A | 4/1980 | Gianotti et al. | |
| 4,211,048 A | 7/1980 | Naka | |
| 4,239,489 A | 12/1980 | Ellmas et al. | |
| 4,250,681 A | 2/1981 | Helderman | |
| 4,261,598 A * | 4/1981 | Cornwall | 285/56 |
| 4,287,807 A | 9/1981 | Pacharis et al. | |
| 4,325,575 A | 4/1982 | Holt et al. | |
| 4,408,940 A | 10/1983 | Fischer | |
| 4,650,276 A | 3/1987 | Lanzisera et al. | |
| 4,726,561 A | 2/1988 | Worzala, Jr. | |
| 4,812,096 A | 3/1989 | Peterson | |
| 4,945,704 A | 8/1990 | Brown, Jr. | |
| 5,081,811 A | 1/1992 | Sasaki | |
| 5,085,547 A | 2/1992 | Vanotti | |
| 5,205,690 A | 4/1993 | Roth | |
| 5,375,384 A | 12/1994 | Wolfson | |
| 5,641,256 A | 6/1997 | Gundy | |
| 5,653,078 A | 8/1997 | Kies et al. | |
| 5,653,563 A | 8/1997 | Ernst et al. | |
| 5,740,651 A | 4/1998 | Vanotti | |
| 5,772,372 A | 6/1998 | Lins et al. | |
| 5,957,644 A | 9/1999 | Vaughan | |
| 6,135,687 A | 10/2000 | Leek et al. | |
| 6,161,339 A | 12/2000 | Cornett et al. | |
| 6,195,949 B1 | 3/2001 | Schuyler | |
| 6,240,697 B1 * | 6/2001 | Thompson et al. | 52/698 |
| 6,341,452 B1 | 1/2002 | Bollinghaus | |
| 6,350,093 B1 | 2/2002 | Petersen et al. | |
| 6,513,300 B1 | 2/2003 | James | |
| 6,904,728 B2 | 6/2005 | Stutts | |
| 7,093,400 B1 | 8/2006 | Thompson et al. | |
| 7,144,530 B2 | 12/2006 | Ward et al. | |
| 7,150,132 B2 | 12/2006 | Commins | |
| 7,174,679 B1 | 2/2007 | Mueller | |
| 7,296,382 B2 | 11/2007 | Sack | |
| 7,445,192 B2 | 11/2008 | Gridley et al. | |
| 7,752,824 B2 | 7/2010 | Brown et al. | |
| 7,766,299 B2 | 8/2010 | Titus et al. | |
| 7,946,086 B2 | 5/2011 | Hammer et al. | |
| 7,971,411 B2 | 7/2011 | Commins | |
| 8,136,318 B2 | 3/2012 | Espinosa | |
| 8,590,247 B2 * | 11/2013 | Cooke | 52/506.05 |
| 8,621,816 B1 * | 1/2014 | Lin et al. | 52/699 |
| 8,875,471 B2 * | 11/2014 | Siqueiros | 52/745.2 |
| 2002/0189175 A1 | 12/2002 | Lancelot et al. | |
| 2005/0055897 A1 | 3/2005 | Commins | |
| 2006/0137285 A1 | 6/2006 | Brown | |
| 2010/0290859 A1 | 11/2010 | Noce et al. | |
| 2011/0041449 A1 * | 2/2011 | Espinosa | 52/698 |
| 2011/0041450 A1 | 2/2011 | Espinosa | |
| 2011/0107715 A1 | 5/2011 | Cooke | |
| 2011/0192111 A1 | 8/2011 | White et al. | |

FOREIGN PATENT DOCUMENTS

| | | |
|---|---|---|
| JP | 2001-214534 | 8/2001 |
| WO | 2010/090736 | 8/2010 |
| WO | 2010/090748 | 8/2010 |

* cited by examiner

HOLDER FOR CONCRETE ANCHORS

FIELD OF THE INVENTION

The present invention is generally directed to anchor holders for concrete anchors for positioning the anchors on a concrete form surface prior to pouring concrete.

SUMMARY OF THE INVENTION

The present invention provides a holder for a concrete anchor, comprising a body including a base portion for attachment to a concrete forming surface. The body includes a projection portion extending vertically from the base portion. A coupling is attached to the projection portion at one end of the coupling. The opposite end of the coupling is for threading into an anchor body.

The projection portion may extend centrally from the base portion. The projection portion may include an axial opening for receiving an attachment hardware. The base portion may include a flange surface extending radially outwardly of the projection portion. The base portion may be circular in plan view. The base portion may include a circumferential sidewall inclined upwardly and inwardly toward the projection portion. The base portion includes a circumferential bottom surface for engaging the concrete forming surface. The base portion may include a hollow bottom and a rib portion extends diametrically across the hollow bottom.

A nail may be disposed in the axial opening with the nail head resting on a top surface of projection portion. A nail including a nail head may be embedded in projection portion and the nail shank extending downwardly from the base portion.

The holder may include a washer disposed between the flange surface and the bottom edge of the coupling. The base portion may include a plurality of vertical openings for receiving a plurality of nails disposed in respective vertical openings and nail heads are disposed underneath the washer.

The washer may include a plurality of pointed shafts extending downwardly from a bottom surface of the washer and the shafts are disposed in respective vertical openings.

The washer includes a peripheral edge portion that may extend beyond the sidewall of the base portion.

The holder may not include the washer, in which case, the nail heads are disposed directly underneath the bottom edge of the coupling.

The base portion may include a plurality of pointed shafts extending downwardly from a bottom portion of the base portion. In this embodiment, the pointed shafts take the place of the separate nails. A single pointed shaft may be used, extending longitudinally of the projection portion.

The coupling may include multiple diameter threaded holes. The coupling may include an internal shoulder between the juncture of the threaded holes. A nail disposed in the axial opening in the projection portion has its nail head engaged between the shoulder and the top surface of the projection portion.

The projection portion may be threaded or provided with a cylindrical surface with a single segmented thread.

The present invention further provides a concrete anchor, comprising a body including a base portion for attachment to a concrete forming surface. The body includes a projection portion extending from the base portion. An anchor body having an internal threaded bore is attached to the projection portion. The anchor body may include a rod portion at one end of which is disposed internal threaded bore and a head portion at an opposite end of the rod portion.

DETAILED DESCRIPTION OF THE INVENTION

Figure 1:
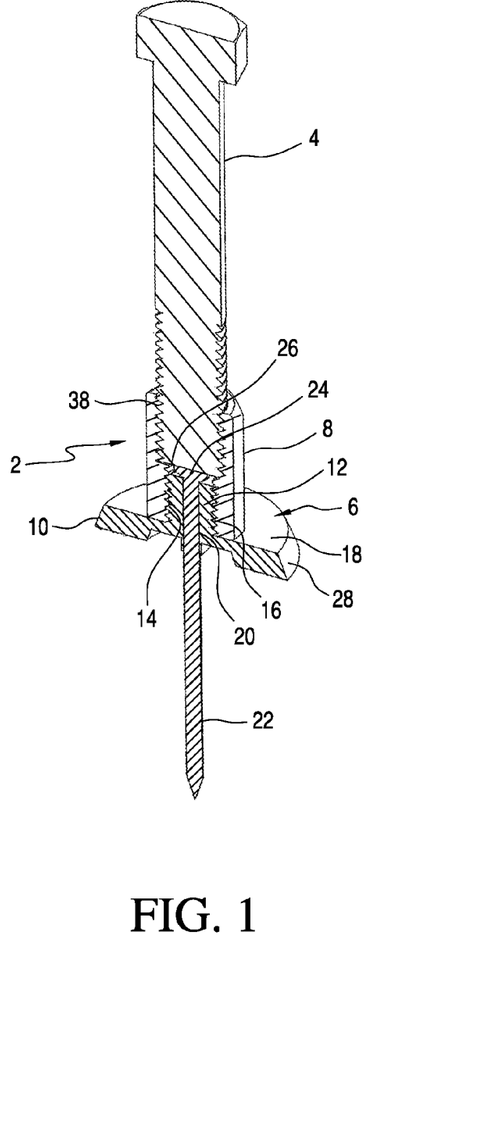
FIG. 1 is a top perspective longitudinal cross-sectional view of an anchor holder embodying the present invention, shown with an anchor body attached.
Figure 2:
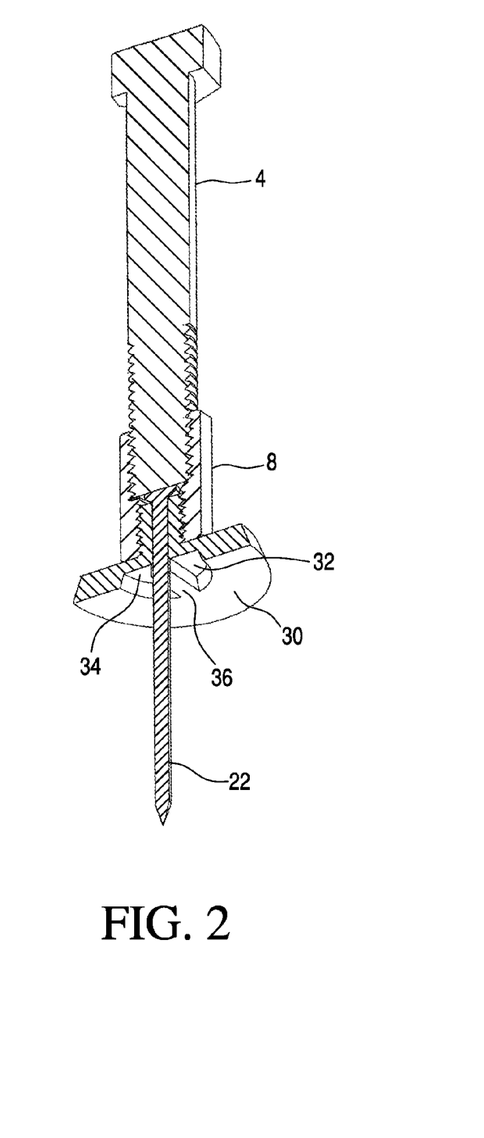
FIG. 2 is a bottom perspective of FIG. 1.

A holder 2 for a concrete anchor body 4 is disclosed in FIGS. 1 and 2. The holder 2 is used for positioning the concrete anchor body 4 on a formboard prior to a concrete pour. The holder 2 comprises a body 6 and a coupling 8 attached to the body 6 at one end of the coupling 8. An opposite end of the coupling 8 is attached to the anchor body 4. The anchor body 4 is disclosed as a standard bolt, but any known anchor body, such as a threaded rod, a bent rod, etc. may be used with the holder 2.

The body 6 comprises a base portion 10 and a projection portion 12 extending upwardly and vertically from the base portion 10. The base portion 10 is preferably circular in plan view and the projection portion 12 preferably extends centrally from the base portion 10.

The coupling 8 is shown attached to the projection portion 12 with cooperating threads 14 on the projection portion 12 and the inside threads 16 in the coupling 8. Other means of attachment may be used. For example, the projection portion 12 may be cylindrical with a diameter slightly larger than the internal minor diameter of the threads 16 to provide an interference fit between the projection portion and the coupling 8. The minor diameter of a threaded opening is the distance measured across the opening between opposite crests of the thread. The body 6 may be made of plastic or metal.

The base portion 10 includes a flange surface 18 that extends radially outwardly from the projection portion 12. The projection portion 12 preferably extends perpendicularly to the flange surface 18. An axial opening 20 is disposed through a central axis of the projection portion 12 for receiving a nail 22 or other standard attaching hardware. The nail head 24 is in direct contact with a bottom surface 26 of the anchor body 4. During installation of the holder 2 to a wood deck that forms part of a concrete form, the anchor body 4 is hammered to drive the nail 22 into the wood deck via contact between the nail head 24 and the bottom surface 26 of the concrete body 4.

The body 6 includes a circumferential side wall 28, which is inclined upwardly and inwardly toward the projection portion 12. The inclined side wall 28 advantageously facilitates the removal of the body 6 from the coupling 8 and detachment from the concrete after the concrete has cured and the wood deck has been removed.

The base portion 10 includes a circumferential bottom surface 30 for engaging the wood deck. The bottom surface 30 is configured to lay on the concrete forming surface and will be exposed when the concrete form is removed after the concrete has cured. The bottom of the base portion 10 is hollow with recesses 32 and 34 and is provided with a rib member 36 extending diametrically across the bottom. The rib member 36 and the recesses 32 and 34 may be used in cooperation with a tool, such as a yoke attached to a drill, for unscrewing the body 6 from the coupling 8 after the wood deck has been removed. Since the nail 22 is attached to the body 6, the nail 22 is also removed. When the body 6 is made of plastic or other material softer than the coupling 8, the act of removing the wood deck may also strip the projection portion 12 from the threads 16 of the coupling 8, thereby saving time in removing the nail and the body 6.

The body 6 acts as a plug to seal the interior of the coupling 8 in cooperation with the anchor body 4 from the concrete slurry when concrete is poured. The body 6 may also be advantageously re-used after removal from the coupling 8.

The coupling 8 has internal threads 38, which may be smaller, equal to or greater than the diameter of the threads 16, or may be of different type, depending on the load application of the holder 2.

Figure 3:
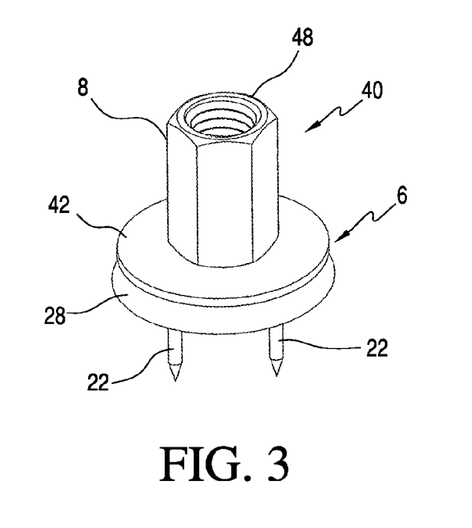
FIG. 3 is a top perspective view of another embodiment of an anchor holder, embodying the present invention.
Figure 4:
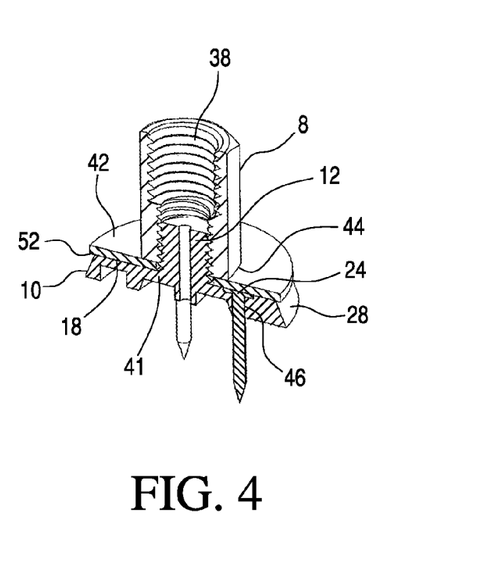
FIG. 4 is a top perspective longitudinal cross-sectional view of FIG. 3.
Figure 5:
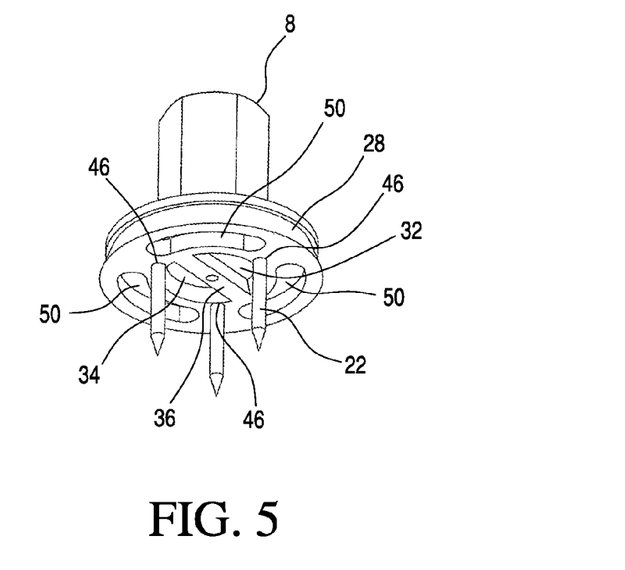
FIG. 5 is a bottom perspective view of FIG. 3.

Another embodiment of a holder 40 is disclosed in FIGS. 3-5. Features identical to those disclosed in the holder 2 are identified with like reference numerals in the following description.

A body 41, similar to the body 6, is attached to the coupling 8. A washer 42, preferably made of metal, is provided on the flange surface 18. The washer 42 is sandwiched between the bottom edge 44 of the coupling 8 and the flange surface 18 of the base portion 10. The base portion 10 includes a plurality of vertical holes 46 for receiving the respective nails 22. The nail heads 24 are advantageously disposed underneath the washer 42. The holder 40 is attached to the formboard surface by hammering the top edge 48 of the coupling 8. The force of the hammer blows is transmitted to the nail heads 24 via the washer 42, thereby driving the nails 22 to the formboard.

Preferably, three nails are used for stability during installation, but a different number may be used. The nails 22 may or may not be pre-installed in the respective holes 46. The nails 22 may be provided separate from the body 6 so that an installer will have to insert the nails in the respective holes 46 prior to installation.

The underside of the base portion 10 has a plurality of arc-shaped cavities 50 disposed near the sidewall 28. In addition to the rib member 36, the cavities 50 provide vertical wall surfaces for engaging a removal tool, such as a yoke attached to a drill, for unscrewing the body 41. A tool may also be attached to the protruding nails to unscrew the body 6 from the coupling 8. The threads 38 in the coupling 8 are used for attaching an anchor body such as the standard bolt 4 or other standard anchor bodies to be embedded in concrete.

The washer 42 preferably has a larger diameter than the diameter of the base portion 10 such that a peripheral edge portion 52 of the washer 42 advantageously extends beyond the sidewall 28 so that the washer 42 will remain embedded in the concrete after the body 41 is removed from the coupling 8 when the formboard is removed. The washer 42 advantageously provides a bearing surface for a locking nut that would be used to lock a hanging rod to the coupling 8 when the hanging rod is threaded to the exposed end of the coupling 8. The washer 42 may also be color coded to indicate the load capacity of the anchor 4 and the coupling 8. The color coded washer will be visible after the wood deck has been removed.

Figure 6:
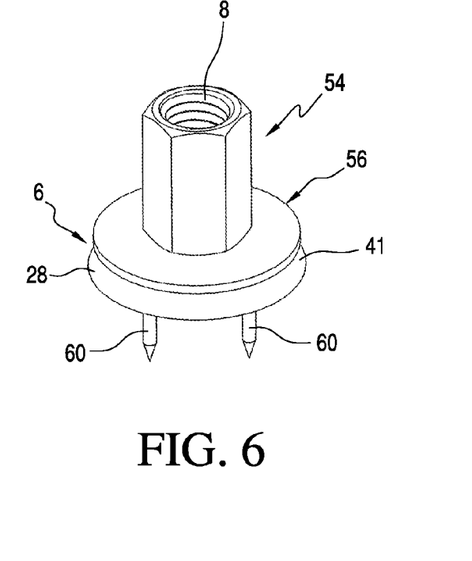
FIG. 6 is a top perspective view of another embodiment of an anchor holder, embodying the present invention.
Figure 7:
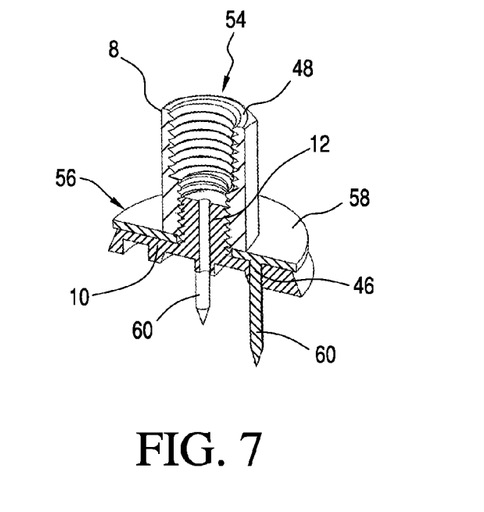
FIG. 7 is a top perspective longitudinal cross-sectional view of FIG. 6.
Figure 8:
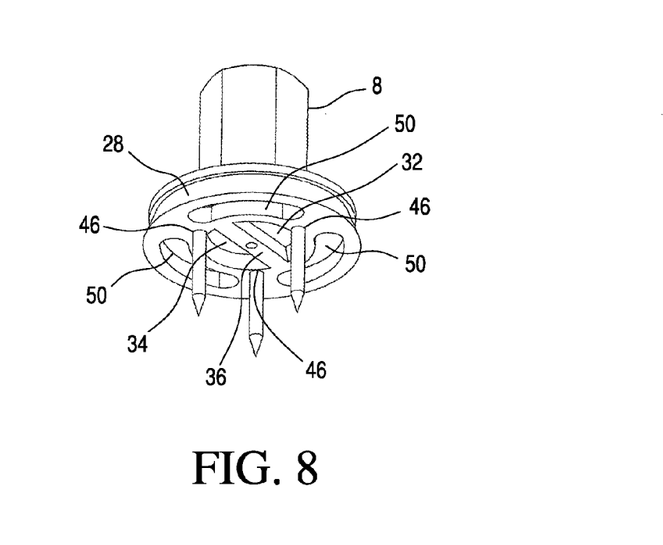
FIG. 8 is a bottom perspective view of FIG. 6.

Another embodiment of a holder 54 is disclosed in FIGS. 6-8. The holder 54 is identical to the holder 40, except that the washer 42 and the nails 22 are integrated together as one unit 56. The unit 56 includes a washer portion 58 and pointed shaft portions 60 extending downwardly from the washer portion 58. The shaft portions 60 protrude through the respective vertical openings 46 in the base portion 10 of the body 6. The unit 56 may be made from metal, such as magnesium.

The holder 54 is attached to the formboard by hammering on the top edge 48 of the coupling 8 to drive the pointed shaft portions 60 into the foamboard.

Figure 9:
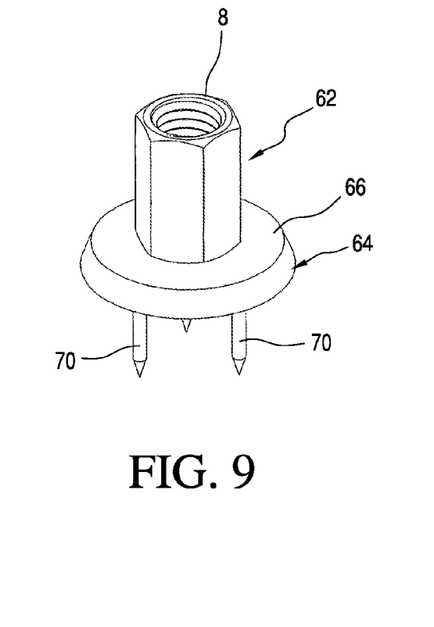
FIG. 9 is a top perspective view of another embodiment of an anchor holder, embodying the present invention.
Figure 10:
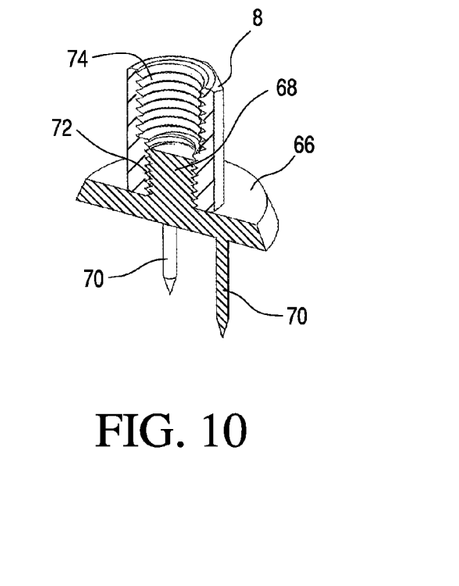
FIG. 10 is a top perspective longitudinal cross-sectional view of FIG. 9.
Figure 11:
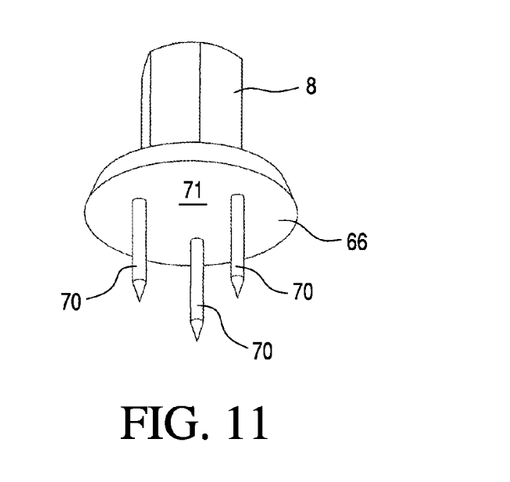
FIG. 11 is a bottom perspective view of FIG. 9.
Figure 12:
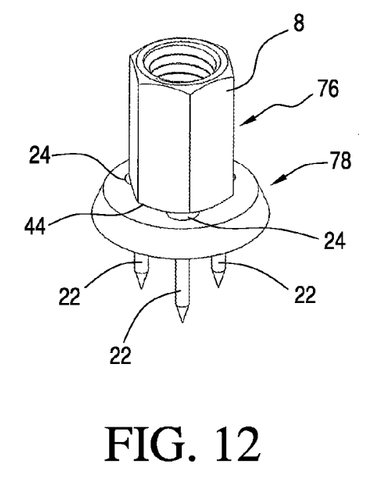
FIG. 12 is a top perspective view of another embodiment of an anchor holder, embodying the present invention.
Figure 13:
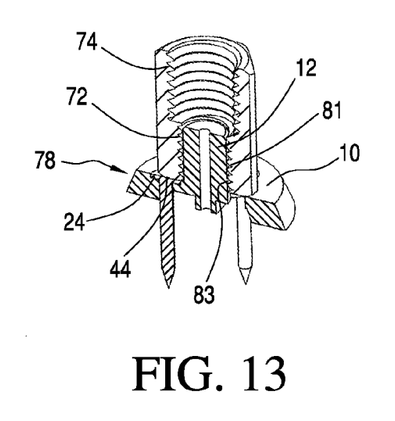
FIG. 13 is a top perspective longitudinal cross-sectional view of FIG. 12.
Figure 14:
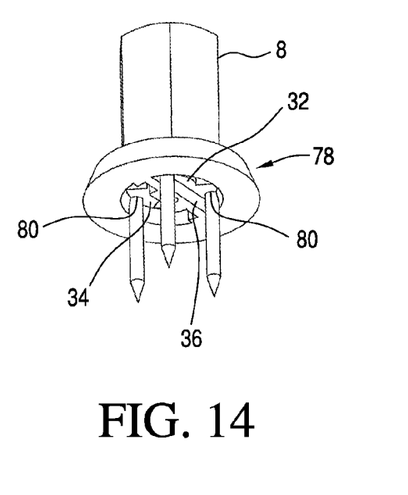
FIG. 14 is a bottom perspective view of FIG. 12.

Another embodiment of a holder 62 is disclosed in FIGS. 9-11. The holder 62 includes the coupling 8 and a body 64, preferably made of metal. The body 64 includes a base portion 66, a projection portion 68 extending vertically upwardly from the base portion 66 and a plurality of pointed shafts 70 extending downwardly from the base portion 66. The projection portion 68 includes threads 72 for screwing into one end of the coupling 8. A standard anchor body, such as the bolt 4, is attached to the opposite end of the coupling 8 via the threads 74, which may be of different size and type from the threads 72. The base portion 66 has a flat bottom surface 71 for engaging the surface of the formboard.

To install the holder 62, the coupling 8 is simply hammered into the wood deck that forms part of the concrete form. After the concrete cures, the wooden deck is removed, exposing the pointed shafts 70 and the base portion 66. The body 64 is removed from the coupling 8 by simply unscrewing the projection portion 68 from the coupling 8. A tool attached to the pointed shafts 70 and powered by a drill may be used to remove the body 64 from the coupling 8.

Another embodiment of a holder 76 is disclosed in FIGS. 12-15. The holder 76 is similar to the holder 40 but without the washer 42. The nail heads 24 are advantageously disposed directly underneath the bottom edge 44 of the coupling 8 such that hammer blows to the coupling 8 during installation are transmitted directly to the nails 22, without the use of the washer 42 to drive the nails 22 into the formboard that forms part of the concrete foam. The holder 76 comprises a body 78 comprising the projection portion 12 extending vertically from the base portion 10. A plurality of holes 80 are provided vertically through the base portion 10. The holes 80 are advantageously disposed underneath the bottom edge 44 of the coupling 8.

The projection portion 12 may include a cylindrical surface 81 with a single segmented thread 83 for attaching to the threads 72 of the coupling 8. The single segmented thread 83 advantageously provides for quick removal of the body 78 after the concrete has cured. When the formboard to which the holder 78 is attached is removed, the segmented thread 83 may be advantageously stripped from the threads 72 of the coupling 8, thereby facilitating the operation of unscrewing the body 78 from the coupling 8. Further, even if the body 78 has to be unscrewed, one or two turns would be sufficient to detach the body 78 from the coupling 8. The body 78 may be made of plastic or metal softer than the coupling 8, if desired, to facilitate the strip removal from the coupling 8. The rib member 36 and the cavities 32 and 34 may be used with a tool in removing the body 78, if needed, strip removal is not desired.

Figure 16:
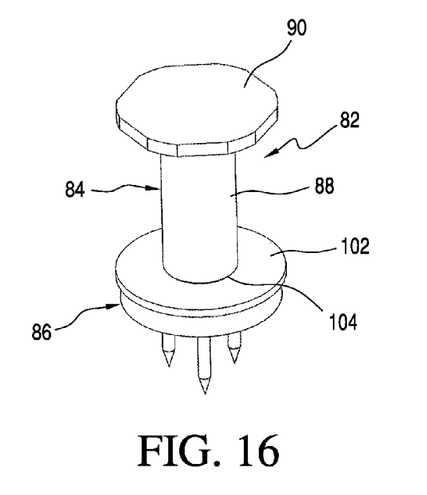
FIG. 16 is a top perspective view of another embodiment of an anchor holder, embodying the present invention.
Figure 17:
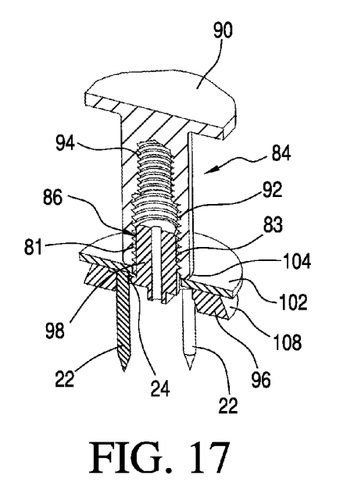
FIG. 17 is a top perspective longitudinal cross-sectional view of FIG. 16.
Figure 18:
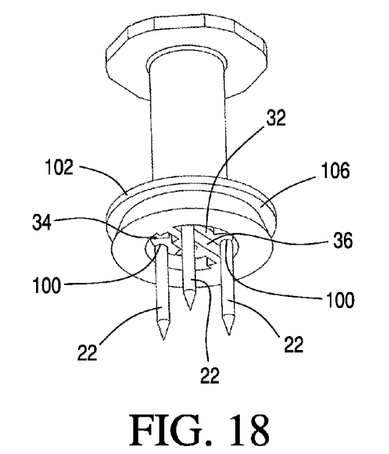
FIG. 18 is a bottom perspective view of FIG. 16.
Figure 19:
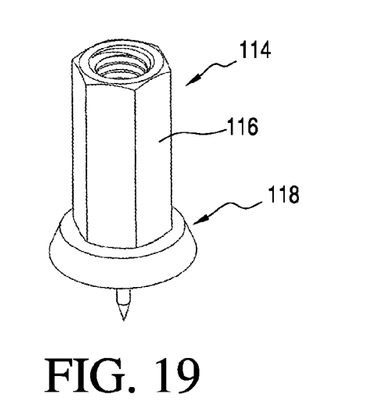
FIG. 19 is a top perspective view of another embodiment of an anchor holder, embodying the present invention.
Figure 20:
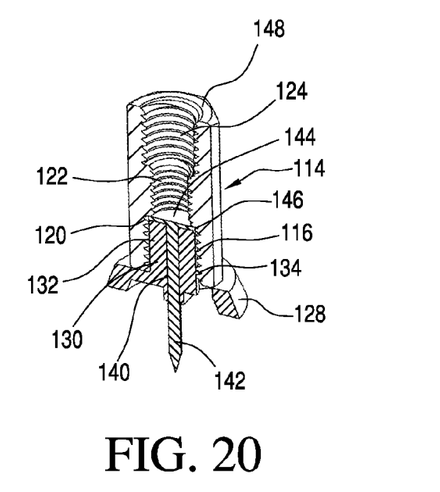
FIG. 20 is a top perspective longitudinal cross-sectional view of FIG. 19.
Figure 21:
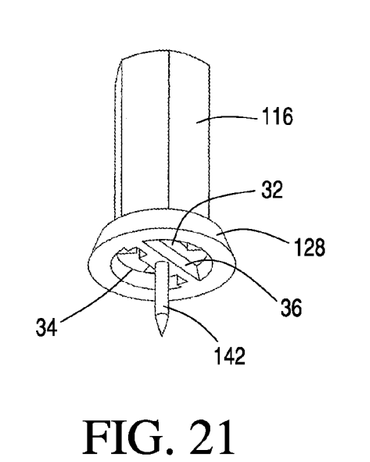
FIG. 21 is a bottom perspective view of FIG. 19.
Figure 22:
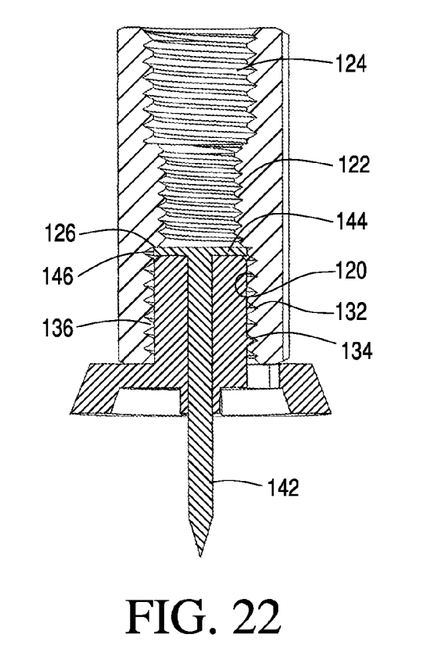
FIG. 22 is an enlarged elevational view of FIG. 20.

An anchor 82 is disclosed FIGS. 16-18. The anchor 82 comprises an anchor body 84 and an anchor holder 86. The anchor body 84 includes a rod portion 88 and a head portion 90. The rod portion 88 may include one or more threaded internal bores 92 and 94. When provided with multiple bores, the inner bore 94 would be of smaller diameter than the outer bore 92. By providing multiple bores, the anchor body 84 may be used to hold different diameter hanging rods (not shown), depending on the particular load application.

The anchor holder 86 includes a base portion 96 and a projection portion 98 extending upwardly vertically from the base portion 96. A plurality of holes 100 are provided vertically through the base portion 96 for receiving respective nails 22. A washer 102 is sandwiched between the bottom edge 104 of the anchor body 84 and the base portion 96. The nail heads 24 are advantageously positioned underneath the washer 102 such that hammer blows to head portion 90 are transmitted to the nails 22 via the washer 102 and the nail heads 24 when installing the anchor 82 to the wood deck that forms part of the concrete form.

Circumferential edge portion 106 of the washer 102 extends beyond the circumferential side wall 108 of the base portion 96 such that when the wood deck and the holder 84 are removed, the washer remains embedded in the concrete, held there by the amount of concrete occupying the space underneath the circumferential edge portion 106. The washer 102 advantageously provides a bearing surface for a lock nut for locking a hanging rod to the anchor body 84. The rib member 36 and the cavities 32 and 34 may be used with a tool in removing the holder 86, if needed.

Figure 15:
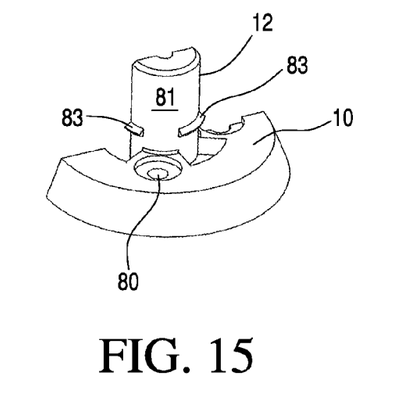
FIG. 15 is an enlarged top perspective longitudinal cross-sectional view of a body component shown in FIG. 13.

The projection portion 98 may include a cylindrical surface 81 and a single segmented thread 83 (see FIG. 15). The single segmented thread 83 is used to attach the anchor body 84 to the holder 86. The single segmented thread 83 may be used in lieu of a plurality of threads shown in the other embodiments of the present invention as described above. However, the projection portion 98 may also be provided with multiple threads as disclosed in the other embodiments of the invention. It should be understood that the single segmented thread embodiment may be used in all the holder embodiments disclosed herein. Further, the various features described in one embodiment may be applied to the other holder embodiments disclosed herein.

Another embodiment of an anchor holder 114 is disclosed in FIGS. 19-22. The anchor holder 114 comprises a coupling 116 and a body 118 attached to the coupling 116. The coupling 116 has multiple threaded bores 120, 122 and 124. The diameter of the bore 122 is smaller than the diameter of the bore 120 such that a shoulder 126 is formed at the juncture of the bores 120 and 122. The body 118 includes a base portion 128 and a projection portion 130 extending upwardly vertically from the base portion 128. The projection portion 130 includes a cylindrical surface 132 provided with a single segmented thread 134 that cooperates with the threads 136 on the threaded bore 120 (see also FIG. 15). The projection portion 130 may also be provided with multiple threads if desired, as in the other embodiments described herein. An axial opening 140 through the projection portion 130 receives the shank of the nail 142. The nail head 144 extends across the diameter of the bore 120 such that its peripheral edge portion 146 engages the shoulder 126.

To install the holder 114 to the formboard, the top edge 148 of the coupling 116 is driven with a hammer whereby the force is transferred to the nail head 144 via the shoulder 126.

After the concrete has cured, the formboard is removed, exposing the nail 142 and the base 128. The holder 114 is removed by unscrewing the base 128. With the use of the single segmented thread 134, removal of the holder 114 is accomplished with one or more revolution of the holder. The holder 118 may also be stripped from the coupling 116 during the removal of the formboard. The rib member 36 and the cavities 32 and 34 may be used with a tool in removing the body 78, if needed.

Figure 23:
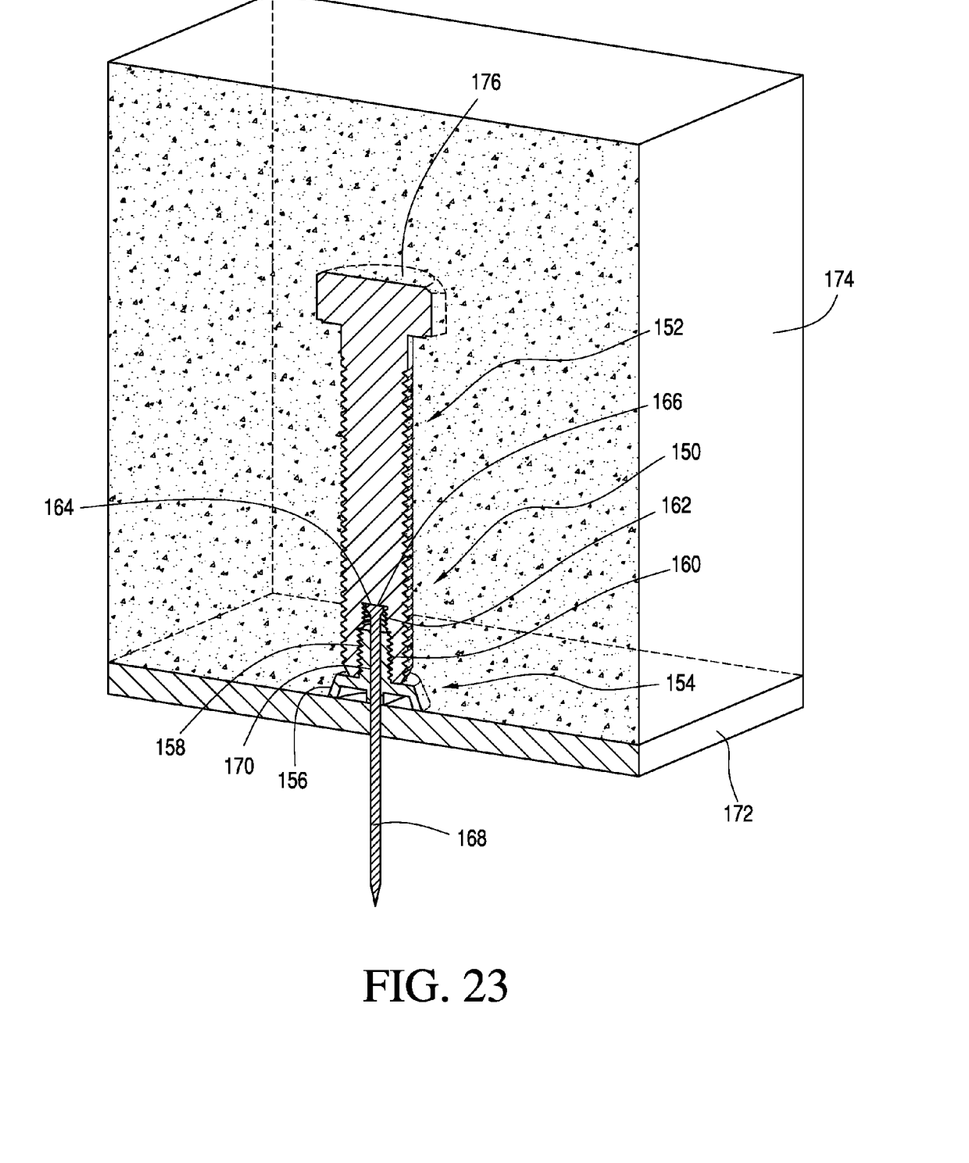
FIG. 23 is top perspective longitudinal cross-sectional view of an anchor holder including an anchor embedded in concrete.

Another embodiment of an anchor 150 is disclosed in FIG. 23. The anchor 150 includes an anchor body 152 and an anchor holder 154. As in the other embodiments, the holder 154 includes a base portion 156 and a projection portion 158 extending vertically upwardly from the base portion 156. The projection portion 158 is threaded for attachment to a threaded bore 160 in the anchor body 152. Another threaded bore 162 is provided in the anchor body 152 for use with smaller diameter hanging rod. The threaded bore 162 includes a ceiling or surface 164 that engages the nail head 166 of a nail 168 disposed in an axial opening 170 in the projection portion 158.

The anchor 152 is attached to a formboard 172 prior to pouring the concrete 174 where the anchor 152 is to be embedded. Installation is accomplished by hammering the head 176 of the anchor body 152, wherein the hammering impact forces are transmitted to the nail head 166 via the bore ceiling 164.

Figure 24:
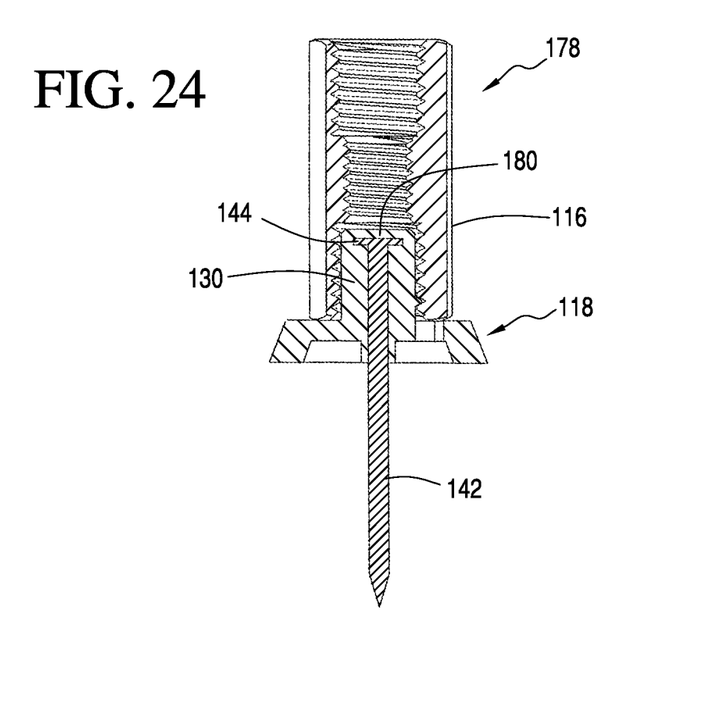
FIG. 24 is a longitudinal cross-sectional view of another embodiment of an anchor holder, embodying the present invention.
Figure 25:
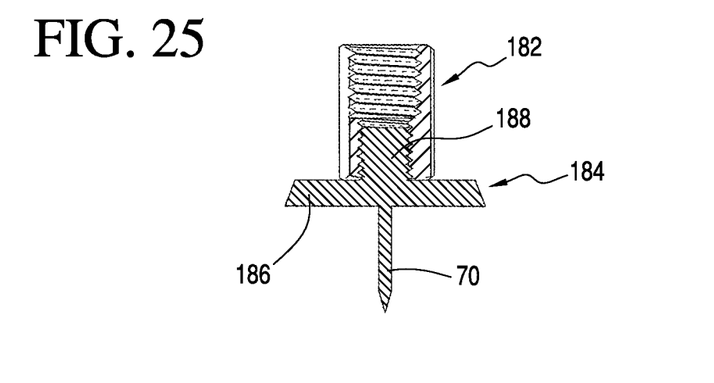
FIG. 25 is a longitudinal cross-sectional view another embodiment of an anchor holder, embodying the present invention.

Referring to FIG. 24, the holder 114 shown in FIGS. 19-22 is modified into another embodiment of a holder 178. The nail head 144 is embedded within the projection portion 130 of the body 118. The holder 178 would be installed to the formboard by hammering directly on the top surface 180 of the projection portion 130, after the coupling 116 is first removed. Referring to FIG. 25, the holder 178 is further modified as holder 182. The nail 142 and the body 118 are integrated into one unit 184, similar to the holder 62 shown in FIGS. 9-11, except that only one central pointed shaft 70 is used. The pointed shaft 70 extends downwardly from the base portion 186 and longitudinally of the projection portion 188.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

I claim:

1. A holder for a concrete anchor, comprising:
   a) a body;
   b) said body including a base portion configured to be attached to a concrete forming surface prior to pouring concrete;
   b) said body including a projection portion extending from said base portion;
   c) a coupling having one end attached to said projection portion, said coupling having an opposite end for attachment to an anchor body; and
   d) said projection portion is configured to be removable from said coupling after the concrete has cured to expose said one end of said coupling for attachment to a load.

2. A holder as in claim 1, wherein said projection portion extends centrally from said base portion.

3. A holder as in claim 1, wherein said projection portion includes an axial opening for receiving an attachment hardware.

4. A holder as in claim 3, and further comprising:
   a) a nail disposed in said axial opening; and
   b) said nail includes a nail head resting on a top surface of said projection portion.

5. A holder as in claim 1, wherein said base portion includes a flange surface extending radially outwardly from said projection portion.

6. A holder as in claim 5, wherein:
   a) said flange surface includes vertical openings;
   b) a plurality of nails disposed in respective said vertical openings; and
   c) said nails including respective nail heads disposed underneath a bottom edge of said coupling.

7. A holder as in claim 1, wherein said base portion is circular in plan view.

8. A holder as in claim 7, wherein said base portion includes a circumferential sidewall inclined upwardly and inwardly toward said projection portion.

9. A holder as in claim 7, wherein said base portion includes a circumferential bottom surface for engaging the concrete forming surface.

10. A holder as in claim 9, wherein:
    a) said base portion includes a hollow bottom; and
    b) a rib portion extends diametrically across said hollow bottom.

11. A holder as in claim 1, and further comprising:
    a) a washer;
    b) said base portion includes a flange surface extending radially outwardly from said projection portion;
    c) said washer is disposed on said flange surface; and
    d) said coupling includes a bottom edge resting on said washer.

12. A holder as in claim 11, wherein said flange surface includes vertical openings for receiving a plurality of attachment hardware.

13. A holder as in claim 12, and further comprising:
    a) a plurality of nails disposed in respective said vertical openings; and
    b) said nails including respective nail heads disposed underneath said washer.

14. A holder as in claim 11, wherein:
    a) said washer includes a plurality of pointed shafts extending downwardly from a bottom surface of said washer; and
    a) said shafts are disposed in respective vertical openings in said base portion.

15. A holder as in claim 11, wherein:
    a) said base portion includes a circumferential sidewall inclined upwardly and inwardly toward said projection portion; and
    b) said washer extends beyond said sidewall.

16. A holder as in claim 1, wherein said base portion includes a plurality of pointed shafts extending downwardly from a bottom portion of said base portion.

17. A holder as in claim 1, wherein said coupling includes multiple diameter threaded holes.

18. A holder as in claim 17, wherein:
    a) said projection portion includes an axial opening;
    b) a nail disposed in said axial opening;
    c) said coupling includes an internal shoulder at a juncture of first and second diameter threaded holes; and
    d) said shoulder is pressed on a nail head of said nail.

19. A holder as in claim 1, wherein said projection portion is threaded.

20. A holder as in claim 1, wherein said projection portion includes a segmented thread.

21. A holder as in claim 1, and further comprising:
    a) a nail including a nail head embedded in said projection portion; and
    b) said nail including a shank extending downwardly from said base portion.

22. A holder as in claim 1, wherein said base portion includes a pointed shaft extending downwardly from a bottom portion of said base portion and longitudinally of said projection portion.

23. A concrete anchor, comprising:
    a) a body;
    b) said body including a base portion configured to be attached to a concrete forming surface prior to pouring concrete;
    b) said body including a projection portion extending from said base portion;
    c) an anchor body having an internal threaded bore attached to said projection portion; and
    d) said projection portion is configured to be removable from said internal threaded bore after the concrete has cured to expose said internal threaded bore for attachment to a load.

24. A concrete anchor as in claim 23, wherein:
    a) said anchor body includes rod portion;
    b) said internal threaded bore is disposed at one end of said rod portion; and
    c) a head portion is disposed at an opposite end of said rod portion.

25. A holder for a concrete anchor, comprising:
    a) a body including a base portion for attachment to a concrete forming surface;
    b) said body including a projection portion extending vertically from said base portion;
    c) said base portion including a flange surface extending radially outwardly from said projection portion;
    d) a washer disposed on said flange surface;
    e) a coupling having one end attached to said projection portion, said coupling having an opposite end configured to be attached to an anchor body;
    f) said base portion including a circumferential sidewall inclined upwardly and inwardly toward said projection portion; and
    g) said washer extends beyond said sidewall.

26. A holder as in claim 25, wherein said coupling includes a bottom edge resting on said washer.

27. A holder as in claim 25, wherein said washer is color coded to indicate a load capacity of said coupling and the anchor body.

* * * * *